United States Patent [19]

Huang et al.

[11] 4,360,624

[45] Nov. 23, 1982

[54] SMOKE AND FIRE RETARDANTS FOR HALOGEN-CONTAINING PLASTIC COMPOSITIONS

[75] Inventors: Joseph M. G. Huang, Cranbury; Robert J. Capwell, East Windsor; Michael A. De Sesa, Fair Haven, all of N.J.

[73] Assignee: Anzon America, Inc., Freehold, N.J.

[21] Appl. No.: 234,837

[22] Filed: Feb. 13, 1981

Related U.S. Application Data

[63] Continuation of Ser. No. 123,653, Feb. 22, 1980, abandoned, which is a continuation of Ser. No. 834,486, Sep. 19, 1977, abandoned, which is a continuation-in-part of Ser. No. 732,221, Oct. 14, 1976, abandoned.

[51] Int. Cl.$^3$ ............................................. C08K 3/22
[52] U.S. Cl. .................................. 524/411; 524/432; 106/296; 106/306
[58] Field of Search ................ 260/45.75 W, 45.75 B, 260/42.49; 106/306, 296

[56] References Cited

U.S. PATENT DOCUMENTS

| 2,028,980 | 1/1936 | Korinth et al. | 106/296 |
| 2,286,744 | 6/1942 | Leatherman | 427/392 |
| 3,560,441 | 2/1971 | Schwarcz et al. | 524/405 |
| 3,723,139 | 3/1973 | Larkin et al. | 524/410 |
| 3,869,420 | 3/1975 | Mathis | 524/143 |
| 3,945,974 | 3/1976 | Schwarcz et al. | 524/409 |

OTHER PUBLICATIONS

Flammability of Solid Plastics, vol. 7, Fire and Flammability Series, (1974), pp. 263-275, Sobolev.

Primary Examiner—V. P. Hoke
Attorney, Agent, or Firm—Kenyon & Kenyon

[57] ABSTRACT

A solid solution of zinc oxide and magnesium oxide and/or calcium oxide when added to a halogen-containing plastic composition serves as a smoke and/or fire retardant agent.

This solid solution agent may be added to the plastic composition, preferably with an antimony compound.

23 Claims, No Drawings

SMOKE AND FIRE RETARDANTS FOR HALOGEN-CONTAINING PLASTIC COMPOSITIONS

This application is a continuation of application Ser. No. 123,653, filed Feb. 22, 1980 and now abandoned; application Ser. No. 123,653 was itself a continuation of application Ser. No. 834,486, filed Sept. 19, 1977 and also now abandoned; application Ser. No. 834,486 was a continuation in part of application Ser. No. 732,221, filed Oct. 14, 1976 and similarly now abandoned.

Plastic materials including plastic sheeting, synthetic fibers and the like are generally considered to be hazardous materials from the standpoint of flammability; and in many cases it is the practice to add various flame retardants to the plastic materials to reduce flammability during combustion. Recently, however, the propensity of plastics to create large volumes of smoke, when combusted, has come to be regarded as at least as hazardous, if not more so, than its flammability. Increasing concern with consumer safety and several tragic accidents have contributed to the recognition of smoke evolution as a significant hazard. In many instances of fire, the resulting fatalities have been due to smoke which has prevented safe evacuation of a building due to lack of visibility.

As mentioned above, extensive studies have been made in the area of flame-retardant additives for halogen-containing plastic compositions, examples of which are antimony trioxide, antimony pentoxide, antimony-silica oxide and other organic and inorganic compositions of antimony. Zinc borate has been used also as a flame retardant, but generally not as a smoke suppressant and always at relatively high levels as for example, from 3 to 8 parts per hundred parts resin since lesser amounts are ineffective as a flame retardant. In U.S. Pat. No. 3,723,139, Larkin et al., discloses the addition of antimony oxide in combination with sodium antimonate to polyvinyl chloride plastics to minimize flammability and to suppress smoking.

U.S. Pat. No. 2,945,974 discloses and claims halogen-containing plastic compositions which contain various zinc salts in amounts from 0.2 to 1 part calculated as zinc oxide per hundred parts of polymer resin, which are also useful as smoke suppressants.

However, when these zinc salts are used at higher concentration than that specified above, for retarding fire in addition to smoke, the zinc salts tend to degrade the plastic compositions when they are originally prepared by conventional high temperature processes. Zinc oxide is such a salt which quickly degrades the plastic composition.

Copending application, Ser. No. 531,687 now U.S. Pat. No. 3,996,142, filed Dec. 11, 1975 discloses and claims the use of a magnesium-zinc complex salt of an acid which is useful to impart smoke and flame resistance to the plastic composition. It has been found, however, that when this complex salt composition is employed during the formation of the plastic material, bubbles and gassing can appear in the plastic material due to the release of moisture which is present in the complex salt.

It is desirable, therefore, to produce an agent which provides flame and smoke resistence to plastic material and will not significantly affect the thermal stability of the plastic material.

It has now been surprisingly found that a plastic composition having exceptional flame and smoke resistance can be prepared by incorporating a solid solution of zinc oxide and either magnesium oxide or calcium oxide, or a mixture of magnesium and calcium oxides, as a flame and smoke retardant in a halogencontaining plastic composition. In general, the plastic composition contains from about 0.25%, or 0.5%, to about 10% by weight of the agent comprising a solid solution of zinc oxide and magnesium oxide and/or calcium oxide. The solid solution agent itself contains zinc oxide and an amount of magnesium oxide and/or calcium oxide effective to provide the zinc oxide with sufficient heat stability, i.e., the polymer does not discolor at temperatures up to about 200° C. to 210° C., to permit the processing, e.g. sheet and article formation, milling, extruding, etc., of plastic formulations using polyvinyl chloride and other halogen containing polymer systems. Generally, from about 0.1 to 10 parts of magnesium oxide and/or calcium oxide are used for each part of zinc oxide, the parts being expressed on a weight basis.

Most any type of plastic composition can be satisfactorily treated with the flame and smoke retardant agents of this invention. Among those most commonly used are flexible and rigid polyvinyl chloride, polyolefins, such as polyethylene and polyproplene, polystyrene, polyesters and acrylonitrile-butadiene-styrene, copolymers and the like. These plastic compositions typically contain a halogen and the expression "halogen containing plastic composition" as use herein is intended to include both plastic compositions formed using a halogen-containing polymer such as polyvinyl chloride, and plastic compositions formed using a polymer which does not contain a halogen, such as a polyester, but to which a halogen containing compound is added. Suitable halogen containing compounds which can be added in this manner are decarbromodiphenyl oxide and DECHLORANE 515, a chlorined polyethylene of Hooker Chemicals Co. containing about 65% Cl and having a melting point more than about 350° C. and a particle size of 5 to 16 microns. When such compounds are used, they are generally added in amounts of from about 10 to 35% wt., preferably about 12 to 25% wt of the polymer composition.

A true solution is a homogenous mixture of two or more substances which has several characteristics such as sub-division down to molecular formation, absence of settling, and no fixed proportions of the component substances. While the best known examples of solutions are cases where solids are dissolved in liquids, solutions of liquids in liquids and solids in solids are known. For example, published literature includes a tentative phase diagram for a ZnO/MgO system which shows that this system possesses two solid terminal phases, the periclase solid solution based on the MgO lattice (NaCl type cubic) and the zincite solid solution based on the ZnO Wurtzite type hexagonal lattice. (E. M. Levin, et al., "Phase Diagram for Ceramists, 1969 Supplement", complied at the NBS, 1969, published by the American Chemical Society, p. 87, Figure 2312, System MgO-ZnO, tentative and J. D. H. Donnay and H. M. Ondish, "Crystal Data", 3rd Ed., Vol. 2, Inorganic Compounds, published by the JCPOS, ZnO, H-1.5965, Data for MgO-ZnO solid Solution.) In accordance with this invention it has been found that ZnO/CaO and ZnO/CaO/MgO systems can also form solid solutions. Further, it has been found that such solid solutions are effective flame and smoke retardants, as are ZnO/MgO solid solutions.

The solid solutions of zinc oxide and magnesium oxide and/or calcium oxide of this invention are prepared by thoroughly mixing ground zinc oxide with ground magnesium oxide and/or calcium oxide in the desired proportions and calcining the mixture at a temperature of at least about 500° C., preferably from 800° C. to 1000° C., and up to about 1500° C. to form the solid solution. The magnesium and/or calcium oxide and the zinc oxide may be admixed in the dry state or as a wet slurry mixture. Technical grade reagents may be used as purity is not a critical factor. The magnesium oxide, calcium oxide and the zinc oxide may be added as carbonates, hydroxides and other compounds which decompose to oxide compounds upon calcination. For example, limestone or slaked lime may be used as a source of calcium oxide.

Compositions containing different amounts of zinc oxide, magnesium oxide and calcium oxide have been calcined at different temperatures as described in Example 1 and the formation of solid solutions verified.

Precise lattice parameter measurements using x-ray diffraction have been made to verify the presence of solid solutions in these compositions. A Standard Norelco Diffractometer by Phillips Electronics was used for obtaining the x-ray diffraction two-theta spectra. The operating conditions were:
 (1) To-theta spectrum range: 6°–145°
 (2) KV/Ma: 45/35
 (3) Slit: 1°
 (4) Chart Speed: 30"/hour
 (5) Goniometer Speed: ¼°/minute
 (6) Estimated precision of line measurements: ±0.005°
 (7) Internal standard for correcting two-theta peak position: KCl powder crystals The data in Table 1 represents the lattice parameters ($a_o, c_o$) for five mixtures containing 60 wt. % magnesium oxide and 40 wt. % zinc oxide calcined under different conditions. The lattice parameters clearly indicate solid solution formation in all five samples. The lattice expansion of both magnesium oxide and zinc oxide is in aggreement with published data:

The shift in lattice parameters ($a_o, c_o$) for both the CaO/ZnO and ZnO/MgO/CaO systems, see Table 2, indicates that solid solution occurs during calcining of these systems. The CaO/ZnO system containing 60 wt. % CaO and 40 wt. % ZnO and was calcined at 950° for 2.5 hours. The ZnO/MgO/CaO system contained 18 wt. % ZnO, 41 wt. % MgO and 41 wt. % CaO and was calcined at 900° C. for 4 hours.

Increasing the calcination temperature of the oxide mixture used to form the solid solution of this invention, e.g. from 500° to 1000° C., causes the specific surface area of the solid solution product to undergo a significant decrease. This is a well-known phenomenon. However, it has now been found that the performance properties of the flame retardant smoke suppressant composition are related to the specific surface area. Oxygen index mesurements in semi-rigid polyvinyl chloride formulations, for example, show a corresponding decrease with decreasing surface area. To a lesser extent, the smoke reduction properties of the solid solution product are also diminished. Thus, flame retardant/smoke suppressant efficacy of the solid solutions of this invention is related to both solid solution formation and specific surface area of the particles.

TABLE 1

| Sample Description (wt. %) | Calcination Temp (°C.) | Calcination Time (hrs) | MgO Lattice Parameter* $a_o$ (Å) | ZnO Lattice Parameter $a_o$ (Å) | ZnO Lattice Parameter $c_o$ (Å) |
|---|---|---|---|---|---|
| 40ZnO/60MgO | 900 | 4.5 | 4.22791 | Not Computed | |
| 40ZnO/60MgO | 950 | 0.50 | 4.21854 | Not Computed | |
| 40ZnO/60MgO | 1000 | 0.25 | 4.22048 | Not Computed | |
| 40ZnO/60MgO | 950 | 0.50 | 4.21703 | 3.25102 | 5.20902 |
| 40ZnO/60MgO | 900 | 8 | 4.21228 | Not Computed | |
| pure MgO | — | — | 4.213 | — | |
| Pure ZnO | — | — | — | 3.249 | 5.205 |

*Based on the precision of two-theta angle measurements, the equivalent precision of $a_o$ is ± 0.0006 Å.

TABLE 2

| Sample Description (wt. %) | CaO Lattice Parameter* $a_o$ (Å) | MgO Lattice Parameter* $a_o$ (Å) | ZnO Lattice Parameter* $a_o$ (Å) | ZnO Lattice Parameter* $c_o$ (Å) |
|---|---|---|---|---|
| 60CaO/40ZnO | 4.80894 | — | 3.35113 | 5.20674 |
| 18ZnO/41MgO/41CaO | 4.80901 | 4.22157 | Not Computed | |
| pure CaO | 4.8105 | — | — | — |
| pure MgO | — | 4.213 | — | — |
| pure ZnO | — | — | 3.249 | 5.205 |

*Based on the precision of two-theta angle measurements, the equivalent precision of $a_o$ is ± 0.00006 Å.

Table 3 below presents data for a system containing 40 wt. % zinc oxide and 60 wt. % magnesium oxide calcined at different temperatures, when used in a semi-rigid polyvinyl chloride formulation.

In general, in accordance with this invention, it is desired to calcine the oxide mixture at a temperature, and for a time, sufficient to produce a solid solution and preferably a solid solution which is effective as a smoke and flame retardant. Accordingly, it is generally desired to calcine the mixture at a temperature and for a time effective to produce a solid solution having a specific surface area above 10 $M^2/g$, and more preferably a solid solution having a specific surface area above 16 $M^2/g$, particularly above 30 $M^2/g$. Temperatures above about 500° C., preferably from about 800° C. to about 1000° C., and up to about 1500° C., are suitable. Calcination times of several hours, e.g. from about 15 minutes up to about 10 hours are typical, depending upon the temperature.

Smoke measurements were carried out in the National Bureau of Standards smoke density chamber. Sheets of milled stock, 3 inch square and 40 mils thick, were used as test samples. The time required in minutes to reach 90 percent maximum density (T90) and the maximum smoke corrected for deposition on chamber walls (Dmc) were measured in order to calculate the percent smoke reduction.

Oxygen index values were determined in accordance with ASTM-D2863 method using 150 by 6.5 by 3 millimeter specimens.

The heat stability at 190° C. in PVC was obtained by milling the samples with the resin and other plastic additives. The specimen was cut from the formulated milled sheet and heated at 375° F. for specific time periods. Specimens were withdrawn at given time intervals and the color of the plastic composite was compared with that of the non-additive sample. The brown discoloration was considered a failure and the time (minutes) at failure was recorded and compared to a standard specimen containing no additives which failed at 45 minutes.

A wide range of ZnO/MgO, ZnO/CaO and ZnO/MgO/CaO solid solution compositions are effective flame and smoke retardants in accordance with this invention. Optimum properties are obtained for the ZnO/MgO system when the composition is preferably from about 30% ZnO and 70% MgO to about 50% ZnO and 50% MgO. In the ZnO/CaO system the optimum properties are obtained when the composition is from about 50% ZnO and 50% CaO to about 85% ZnO and 15% CaO. Optimum properties for the ZnO/MgO/CaO system are obtained when the composition comprises from about 10% to 60% ZnO, 10% to 60% MgO and 5% to 50% CaO.

In order to describe more fully the instant invention, the following examples were presented:

EXAMPLE 1

40 grams of zinc oxide and 60 grams of magnesium oxide were mixed thoroughly in a blender. Both the zinc oxide and the magnesium oxide were added as powdered material.

The mixture was placed in a ceramic tube and slowly tumbled throughout the calcination step. The mixture was heated to 950° C. and calcined at that temperature for 4½ hours. After the calcination was completed, the calcined mixture was allowed to cool and the calcine was hammer milled through a 0.02 inch screen to break up the agglomerates which formed during the formation of the solid solution of the mixed oxides.

The solid solution of zinc oxide and magnesium oxide obtained was added to a standard plasticized PVC sheet containing 1.5% antomony oxide. The amount of solid solution added was 2% (equal to 0.7% zinc oxide) and various tests were conducted using this product to show its effectiveness. The percentages are expressed on a weight basis.

The oxygen index was 37.7, the smoke reduction was 36% and the heat stability was 5 minutes less than the nonadditive control sample (Table 4).

To demonstrate the effect of varying the calcination temperature, and thereby, the specific surface area of the solid solution, several mixtures were calcined at different temperatures. Table 3 presents the oxygen index and smoke reduction achieved using these systems.

In these test runs the plasticized PVC sheet was prepared using the following formula:

| Ingredients | Parts |
| --- | --- |
| GEON 102 EP F5, B. F. Goodrich PVC resin inherent viscosity 1.13 ASTM D1755 classification GP-6-15443 Avg. mole wt./wt Avg. → 150,000 | 100 |
| DOP (di (2-ethylhexyl) phthalate) | 23.5 |
| Epoxidized Soybean Oil, Paraplex G-62, Rohm-Haas | 1.5 |
| Ba—Cd Stabilizer, Mark M, Argus Chemicals | 2.0 |
| Stearic Acid | 0.5 |
| Antimony Trioxide | 1.5 |
| ZnO—MgO and/or CaO | As indicated |

TABLE 3

| Sample Description | Calcination Temp (°C.) | Calcination Time (hrs) | OI | % Smoke Reduction | Specific Surface Area M²/g |
| --- | --- | --- | --- | --- | --- |
| 40ZnO/60MgO | 500 | 8 | 39.8 | 40 | 50.3002 |
| 40ZnO/60MgO | 750 | 8 | 38.1 | 41 | 30.7351 |
| 40ZnO/60MgO | 900 | 8 | 36.2 | 33 | 16.1514 |
| 40ZnO/60MgO | 1,000 | 8 | 34.4 | 34 | 3.6814 |

EXAMPLE 2

In this example 989 grams of magnesium oxide and 598 grams of zinc oxide were added to 6 liters of deionized water. The slurry contained 21% solids. After stirring at room temperature for one half hour, the solids were filtered under vacuum. The filter cake was dried in an oven at 120° C. for 18 hours. The dried filter cake was broken up and calcined in a revolving ceramic tube. After reaching 900° C., the charge was calcined at that temperature for 4½ hours. Again, after cooling, the solid solution product was hammer milled through a 0.02 inch screen to break up the agglomerates.

The operational details and the results of the testing procedures are recorded in Table 4.

CONTROLS A-C

In order to show the superiority of using a solid solution of magnesium oxide and zinc oxide in comparison to employing uncalcined mixture of magnesium oxide and zinc oxide, a control run (Control A) was made in which an uncalcined mixture of the two oxides was employed in the same ratio as that used in Example 1. In this particular run, when the mixture was added to the standard PVC product, the heat stability was very poor, i.e. 20 minutes less than the PVC standard containing no additive. This poor heat stability is equal to that obtained when zinc oxide alone (Control B) is used as the additive without the presence of magnesium oxide.

Another control run (Control C) was prepared in which the magnesium oxide and the zinc oxide were calcined separately (i.e. 8 hrs at 900° C.) and the two calcined oxides were then mixed. When this mixture was used in the plastic sheet, then heat stability was good but the % smoke reduction was very poor. The operational details and results obtained are also recorded in the Table along with those of Controls A and B.

EXAMPLES 3-7

The solid solution flame and smoke retardant agent of the instant invention was also compared with the magnesium-zinc sulfate complex salt prepared, disclosed and claimed in copending application, Ser. No. 531,687. It was found that although the heat stability, the oxygen index and the smoke reduction properties were all satisfactory, the complex salt when incorporated into the plastic gassed and formed bubbles which is undesirable. The solid solution agent of the instant invention, however, does not gas nor form bubbles when employed in the plastic material.

In these runs various zinc oxide-magnesium oxide and/or calcium oxide solid solutions were prepared by dry blending the indicated compositions and calcining at the time and temperature shown in Table 4 and used to treat the standard PVC product as follows:

| Example No. | % MgO | % CaO |
| --- | --- | --- |
| 3 | 83.8 | — |
| 4 | 73.5 | — |
| 5 | 4.8 | — |
| 6 | — | 60 |
| 7 | 35 | 35 |

Again, the results are recorded in the Table. It should be noted that the test results were satisfactory in all of the examples except Example 5 where the smoke reduction was unsatisfactory (MgO content low).

TABLE 4

| | % ZnO | % MgO | % CaO | Calcination Time (Hrs.) | Calcination Temp. (°C.) | Heat Stab. (Min. Less Than Std.) | Oxygen Index | % Smoke Reduction |
| --- | --- | --- | --- | --- | --- | --- | --- | --- |
| Example No. | | | | | | | | |
| 1 ZnO/MgO (dry blend) | 40 | 60 | — | 4½ | 950 | 5 | 37.7 | 36 |
| 2 ZnO/MgO (wet blend) | 37.7 | 62.3 | — | 4½ | 900 | 10 | 38.3 | 36 |
| Control | | | | | | | | |
| A ZnO/MgO uncalcined | 40 | 60 | — | 0 | 0 | 20 | 38.9 | 44 |
| B ZnO alone | 100 | — | — | 0 | 0 | 20 | 35.5 | 42 |
| C ZnO MgO calcined separately | 40 | 60 | — | 8 | 900 | 10 | 34.6 | 19 |
| Example No. | | | | | | | | |
| 3 ZnO/MgO | 16.2 | 83.8 | — | 8 | 900 | 10 | 35.0 | 28 |
| 4 ZnO/MgO | 26.5 | 73.5 | — | 8 | 900 | 5 | 34.8 | 30 |
| 5 ZnO/MgO | 95.2 | 4.8 | — | 8 | 900 | 10 | 34.4 | 10 |
| 6 ZnO/CaO | 40 | — | 60 | 2½ | 950 | 10 | 37.0 | 37 |
| 7 ZnO/MgO/CaO | 30 | 35 | 35 | 4 | 900 | 10 | 36.3 | 34 |
| 8 ZnCl$_2$/MgCl$_2$ hydrolyzed | 40 | 60 | — | 2½ | 950 | 5 | 37.9 | 31 |
| 9 ZnNO$_3$/MgNO$_3$ hydrolyzed | 40 | 60 | — | 2½ | 950 | 5 | 38.3 | 40 |
| 10 ZnSO$_4$MgSO$_4$ hydrolyzed | 40 | 60 | — | 2½ | 950 | 5 | 38.3 | 29 |
| 11 Zn/Mg intermetallic alloy | 45.8 | 54.2 | — | 2½ | 950 | 5 | 38.3 | 29 |

All agents added at level equivalent to 0.7% zinc oxide 1.5% antimony oxide present in plastic composition

EXAMPLE 8-11

In these runs various zinc and magnesium compounds were used as starting materials. In Examples 8-10, zinc and magnesium compounds were precipitated as hydroxides from aqueous solutions by the addition of sodium hydroxide. These hydroxides were in turn calcined to form the solid solutions of magnesium oxide and zinc oxide. In Example 8 the chloride salts were used as the starting materials while the nitrates were used in Example 9 and zinc and magnesium sulfate were employed in Example 10.

In Example 11, zinc and magnesium intermetallic alloy (Mg$_2$Zn) was used as the starting material; and during calcination, zinc oxide and magnesium oxide solid solution was formed. In all of these runs satisfactory results were obtained as shown in Table 4.

Although the flame and smoke resistance of a plastic composition is improved when the zinc oxide and magnesium oxide and/or calcium oxide solid solution particles are present in the composition, it has been found that further improvements are obtained when antimony trioxide is also present in the plastic composition.

Mixtures, therefore, of the solid solution of the zinc, magnesium and/or calcium oxides and antimony trioxide have been prepared. The amount of antimony trioxide added to the particles of the solid solution of zinc, magnesium and/or calcium oxide is generally from about 0.05 to 15 parts, preferably from about 0.1 to 10 parts, of antimony trioxide for each part of the solid solution present in the mixture (parts expressed on a weight basis).

It has also been discovered that in some cases the flame and/or smoke resistance may be somewhat increased when various amounts of other agents are also added in addition to the zinc oxide and magnesium oxide and/or calcium oxide solid solutions. These agents include among others zinc borate, aluminum trihydrate, molybdenum trioxide and other commonly used flame and smoke retardant additives.

From the above description and by the examples presented, it has clearly been shown that a halogen containing plastic composition containing a small percentage of the solid solution of zinc oxide and magnesium oxide and/or calcium oxide produces a highly desirable flame and smoke resistant plastic material. By using the solid solution agents of the instant invention as flame and smoke resistant agents, superior results are obtained over those which employ zinc oxide alone, mixtures of zinc oxide and magnesium oxide and complex compositions of magnesium oxide and zinc salts of the acid.

To further illustrate the flame and smoke retardant properties of the solid solutions of this invention, a number of additional tests were made using other plastic compositions.

EXAMPLE 12

A 40/60 ZnO/MgO solid solution prepared by the method of Example 1 was incorporated into a rigid polyvinyl chloride (PVC) pipe formulation and the following results were observed:

| | (A) | (B) | (C) |
| --- | --- | --- | --- |
| The Formulation was, in parts by weight: | | | |
| (1) Geon 103 EP-F76 B. F. Goodrich PVC resin inherent viscosity 0.92 ASTM D-1755 classification 6P-4-16043 avg. mole wt/wt avg. 91,000 | 100.0 | 100.0 | 100.0 |
| (2) Thiotin Stabilizer, M&T Chemicals | 0.5 | 0.5 | 0.5 |
| (3) 165° F. Paraffin Wax | 1.0 | 1.0 | 1.0 |
| (4) Calcium Stearate | 0.7 | 0.7 | 0.7 |
| (5) Plastiflow POP, N.L. Industries flexible/rigid lubricant, modified polyethylene wax specific gravity @ 25° C. 0.96 melting point, 116° C. | 0.15 | 0.15 | 0.15 |
| (6) Calcium Carbonate, Omyalite 90-T | 2.5 | 2.5 | 2.5 |
| (7) TiO$_2$, Titanox 2071 | 1.0 | 1.0 | 1.0 |
| (8) Sb$_2$O$_3$ | 0 | 0 | 2.0 |

-continued

|  | (A) | (B) | (C) |
|---|---|---|---|
| (9) ZnO/MgO | 0 | 0 | 2.0 |
| OXYGEN INDEX - ASTM D-2863A | 48.7 | 58.4 | 66.9 |
| NSB SMOKE DENSITY, 40 MIL STOCKS, FLAMING CONDITIONS | | | |
| Dm (Per gram, corrected) | 50.0 | 38.6 | 32.7 |
| % Reduction | 0 | 23 | 35% |

EXAMPLE 13

The flame and smoke retardant composition of the instant invention is very effective when used in conjunction with phosphate plasticizers. When a 40/60 ZnO/MgO solid solution prepared by the method of Example 1 was incorporated into a PVC wire and cable formulation using phosphate plasticizers, the following results were obtained.

|  | (A) | (B) | (C) | (D) | (E) | (F) |
|---|---|---|---|---|---|---|
| Formulation: (parts by weight) | | | | | | |
| (1) Geon 103 EP B. F. Goodrich PVC resin inherent viscosity 1.02 ASTM D-1755 classification GP-5-15443 avg. mole wt/wt avg 100,000 | 100 | | same | | | |
| (2) Tribase Exl, N.L. Industries lead silicate sulfate % PbO 64.0 specific gravity 3.9 | 5 | | same | | | |
| (3) SP #33 Clay, Kaolin Clay, from Freeport, Georgia electrical grade | 15 | | same | | | |
| (4) Calcium Carbonate, Antomite | 15 | | same | | | |
| (5) Plastiflow POP | 0.2 | | same | | | |
| (6) Mixed Dialkyl Phthalate | 52 | 52 | 26 | 26 | 26 | 26 |
| (7) Tricresyl Phosphate | — | — | 26 | 26 | — | — |
| (8) Alkyl Diaryl Phosphate | — | — | — | — | 26 | 26 |
| (9) $Sb_2O_3$ | — | 5 | — | — | — | — |
| (10) ZnO/MgO | — | 4 | — | 4 | — | 4 |
| OXYGEN INDEX, ASTM D-2863A | 24.9 | 30.6 | 28.3 | 28.5 | 27.1 | 27.5 |
| NSB SMOKE DENSITY, 40 MIL STOCKS, FLAMING CONDITIONS | | | | | | |
| DM (per gram, corrected) | 50.1 | 35.9 | 66.1 | 39.6 | 54.6 | 32.4 |
| % Reduction | 0 | 28 | 0 | 40 | 0 | 41 |

EXAMPLE 14

Very low levels of the flame and smoke retardant composition of the instant invention are effective for suppressing smoke in high impact polystyrene (HIPS). When a 40/60 ZnO/MgO solid solution prepared by the method of Example 1 was incorporated into a HIPS formulation the following resuts were obtained:

|  | (A) | (B) | (C) |
|---|---|---|---|
| Formulation: (parts by weight) | | | |
| (1) HIPS U.C. 6500 | 85 | same | |
| (2) Decabromo Diphenyl Oxide, DOW-300BA | 10 | same | |
| (3) Plastiflow POP | 0.5 | same | |
| (4) $Sb_2O_3$ | 5 | 4.75 | 4.75 |
| (5) ZnO/MgO | 0 | 0.25 | 0.75 |
| NBS SMOKE DENSITY, 25 MIL STOCKS, FLAMING CONDITIONS | | | |
| Dm (per gram, corrected) | 118 | 108 | 95 |
| % Reduction | 0 | 9 | 20 |
| UL 94, Vertical Burning Test | V-O | V-O | V-O |

EXAMPLE 15

Low levels of the flame and smoke retardant composition of the instant invention are effective for suppressing smoke in polypropylene (PP). When a 40/60 ZnO/MgO solid solution prepared by the method of Example 1 was incorporated into a PP formulation the following results were obtained:

|  | (A) | (B) | (C) |
|---|---|---|---|
| Formulation: (parts by weight) | | | |
| (1) PP Pro-Fax 6423 Hercules polypropylene resin, nominal melt flow $I_2$ @ 230° C. 6.5 | 60 | 60 | 60 |
| (2) Dechlorane 515 Hooker Chemicals, % Cl-65, particle size 5-15 microns, melting point >350° C. | 27 | 27 | 27 |
| (3) $Sb_2O_3$ | 13 | 12 | 10 |
| (4) ZnO/MgO | 0 | 1 | 3 |
| NBS SMOKE DENSITY, 25 MIL STOCKS, FLAMING CONDITIONS | | | |
| Dm (per gram, corrected) | 43.7 | 37.7 | 34.9 |
| % Reduction | 0 | 14 | 20 |

EXAMPLE 16

The flame and smoke retardant composition of the instant invention is very effective when used in acrylonitrile-butadienestyrene (ABS) resins. When a 40/60 ZnO/MgO solid solution prepared by the method of Example 1 was incorporated into an ABS formulation the following results were obtained:

|  | (A) | (B) | (C) | (D) |
|---|---|---|---|---|
| Formulation: (parts by weight) | | | | |
| (1) $Sb_2O_3$ | 12.3 | 12.3 | 4 | 4 |
| (2) ZnO/MgO | 0 | 3 | 0 | 3 |
| (3) ABS Cycolac TD 1001, Borg Warner | 61.3 | 61.3 | 82 | 82 |
| (4) Lectro 60XL, N.L. Industries, lead chlorosilicate complex, % PbO-64 | 2 | 2 | 2 | 2 |
| (5) Dechlorane 515 | 24.4 | 24.4 | 0 | 0 |
| (6) Citex BC-26 Cities Service tricyclic bromine complex, % Br-29, % Cl-40 | 0 | 0 | 12 | 12 |
| OXYGEN INDEX, ASTM D-2863A | 26.0 | 29.6 | 25.0 | 24.2 |
| NBS SMOKE DENSITY, 15 MIL STOCKS, FLAMING CONDITIONS | | | | |
| Dm (per gram, corrected) | 84.4 | 78.8 | 117 | 91.8 |
| % Reduction | 0 | 7 | 0 | 22 |

EXAMPLE 17

The flame and smoke retardant composition of the instant invention is very effective when used in conjunction with antimony trioxide or alumina trihydrate (ATH) in semi-rigid polyvinyl chloride (PVC). When a 40/60 ZnO/MgO solid solution prepared by the method of Example 1 was incorporated into a PVC formulation with $Sb_2O_3$ or ATH the following results were obtained:

|  | (A) | (B) | (C) | (D) | (E) | (F) |
|---|---|---|---|---|---|---|
| Formulation: (parts by weight) | | | | | | |
| (1) PVC Geon 102 EP F5 | 100 | | same | | | |
| (2) Deundecyl phthlcate | 30 | | same | | | |
| (3) Dythal, N. L. Industries, dibasic lead stabilizer % PBO-79.8. specific gravity 4.5 | 7 | | same | | | |
| (4) Acrawax C, Glycol Chemicals, fatty diamide synthetic wax | 0.3 | | same | | | |
| (5) DS-207, N. L. Industries dibasic lead sterate, % PBO-553, specific gravity | 0.3 | | same | | | |
| (6) $Sb_2O_3$ | — | 2 | — | 2 | — | — |
| (7) ZnO/MgO | — | — | 2 | 2 | — | 2 |
| (8) ATH | — | — | — | — | 20 | 18 |
| OXYGEN INDES, ASTM D-2863A | 27.9 | 32.1 | 28.1 | 34.1 | 30.1 | 30.8 |
| NBS SMOKE DENSITY, 40 MIL STOCKS, FLAMING CONDITIONS | | | | | | |
| DM (per gram, corrected) | 73 | 75.7 | 39.3 | 40.1 | 53.6 | 39.9 |
| % Reduction | 0 | (+3) | 46 | 45 | 27 | 46 |

EXAMPLE 18

Low levels of the flame and smoke retardant composition of the instant invention are effective for suppressing smoke in halogenated polyesters (HPE). When a 40/60 ZnO/MgO solid solution prepared by the method of Example 1 was incorporated into HPE formulation the following results were obtained:

|  |  | (A) | (B) |
|---|---|---|---|
| Formulation (parts by weight) | | | |
| (1) | HPE Hetron 92AT, Ashland Chemicals halogenated polyester, properties @ 25° C. acid number 18, color (gardner) 5 maximum, viscosity (Brookfield) #2 spindle 50 Rpm 400 #2 spindle 5 Rpm 1100 | 100 | 100 |
| (2) | MEK Peroxide | 1 | 1 |
| (3) | $Sb_2O_3$ | 5 | 5 |
| (4) | ZnO/MgO | 0 | 1 |
| OXYGEN INDEX, ASTM D-2863A | | 43.3 | 43.4 |
| NBS SMOKE DENSITY, 65 MIL STOCKS, FLAMING CONDITIONS | | | |
| Dm (per gram, corrected) | | 57.6 | 44.5 |
| % Reduction | | 0 | 23 |

EXAMPLE 19

It has been found that the flame and smoke retardant composition of the instant invention can function alone or synergistically with antimony trioxide. When a 40/60 ZnO/MgO solid solution prepared by the method of Example 1 was used in conjunction with $Sb_2O_3$ in a semi-rigid polyvinyl chloride (PVC) fromulation the improvement in flame retardancy as measured by the Oxygen Index Test was greater than expected, assuming the effect of $Sb_2O_3$ and ZnO/Mgo was additive. This is shown in the Table below:

The formulation used was that of example 1, in parts

| by weight | |
|---|---|
| (1) PVC | 100 |
| (2) DOP | 23.5 |
| (3) EPOX Oil | 1.5 |
| (4) Ba—Cd Stabilizer | 2 |
| (5) Stearic Acid | 0.5 |
| (6) Additive - $Sb_2O_3$ (x), ZnO/MgO (y) | x + y = 2 |

| Parts by Weight Additive | | | | |
|---|---|---|---|---|
| $Sb_2O_3$ | 40/60 ZnO/MgO | OI | Dm*(per grams corrected) | % Reduction |
| 2 | 0 | 32.9 | 39.0 | 0 |
| 1.5 | 0.5 | 34.6 | — | — |
| 1 | 1 | 34.5 | 21.8 | 44 |
| 0 | 2 | 33.7 | 19.0 | 51 |

*NBS Smoke Density, 40 mil stock, non-flaming conditions

From the above description and by the examples presented, it has clearly been shown that a halogen containing plastic composition containing a small percentage of the solid solution of zinc oxide and magnesium oxide and/or calcium oxide produces a highly desirable flame and smoke resistant plastic material. By using the solid solution agents of the instant invention as a flame and smoke resistant agents, superior results are obtained over those which employ zinc oxide alone, mixtures of zinc oxide and magnesium oxide and complex compositions of magnesium oxide and zinc salts of an acid.

The solid solutions of zinc oxide and magnesium oxide and/or calcium oxide of the instant invention are easily prepared and economical to employ.

While this invention has been described and illustrated by the examples shown, it is not intended to be strictly limited thereto, and other variations and modifications may be employed within the scope of the following claims.

We claim:

1. A flame and smoke resistant halogen-containing plastic composition, said composition containing therein from 0.5% to 10% of a solid solution of zinc oxide and an oxide selected from the group consisting of magnesium oxide, calcium oxide and mixtures thereof, the amount of magnesium oxide and calcium oxide present in said solid solution being from 0.1 to 10 parts for each part of zinc oxide, all of the percentages and parts expressed on a weight basis, said solid solution having a specific surface area of greater than about 10 $M^2/g$.

2. Composition according to claim 1 in which the composition contains a solid solution of zinc oxide and magnesium oxide.

3. Composition according to claim 1 in which the composition contains a solid solution of zinc oxide and calcium oxide.

4. Composition according to claim 1 in which the composition contains a solid solution of zinc oxide, magnesium oxide and calcium oxide.

5. Method of preparing a flame and smoke resistant halogen-containing plastic composition which comprises incorporating in said plastic composition from 0.5% to 10% of a solid solution of zinc oxide and an oxide selected from the group consisting of magnesium oxide and calcium oxide present in said solid solution being from 0.1 to 10 parts for each part of zinc oxide, all of the percentages and parts expressed on a weight basis, said solid solution having a specific surface area of greater than about 10 M$^2$/g.

6. Method according to claim 5 in which said solid solution employed contains zinc oxide and magnesium oxide.

7. Method according to claim 5 in which said solid solution employed contains zinc oxide and calcium oxide.

8. Method according to claim 5 in which said solid solution employed contains zinc oxide, magnesium oxide and calcium oxide.

9. A flame and smoke resistant agent for plastic compositions, said agent comprising a mixture of antimony trioxide and a solid solution of zinc oxide and an oxide selected from the group consisting of magnesium oxide, calcium oxide and mixtures thereof, the amount of magnesium oxide and calcium oxide present in said solid solution being from 0.1 to 10 parts for each part of zinc oxide, in which there are from 0.1 to 10 parts of antimony trioxide for each part of the solid solution present in said mixture, the parts expressed on a weight basis, said solid solution having a specific surface area of greater than about 10 M$^2$/g.

10. The flame and smoke resistant agent of claim 9 wherein the solid solution has a specific surface area greater than about 16 M$^2$/g.

11. A flame and smoke retardant composition comprising a solid solution of zinc oxide and at least one other oxide selected from the group consisting of calcium oxide, magnesium oxide and mixtures thereof, the amount of magnesium oxide and calcium oxide present in said solid solution being from 0.1 to 10 parts for each part of zinc oxide, said solid solution having a specific surface area greater than about 10 M$^2$/g.

12. The composition of claim 11 wherein the solid solution consists of zinc oxide and calcium oxide.

13. The composition of claim 12 containing from about 50 weight percent zinc oxide and 50 weight percent calcium oxide to about 85 weight percent zinc oxide and 15 weight percent calcium oxide.

14. The composition of claim 11 wherein the solid solution consists of zinc oxide and magnesium oxide.

15. The composition of claim 14 containing from about 30 weight percent zinc oxide and 70 weight percent magnesium oxide to about 50 weight percent zinc oxide and 50 weight percent magnesium oxide.

16. The composition of claim 11 wherein the solid solution consists of zinc oxide, magnesium oxide and calcium oxide.

17. The composition of claim 16 containing from about 10 weight percent to 60 weight percent zinc oxide and 5 weight percent to 50 weight percent calcium oxide.

18. A method of preparing a flame and smoke resistant halogen-containing plastic composition which comprises incorporating in said plastic composition from 0.25% to 10% of a solild solution of zinc oxide and an oxide selected from the group consisting of magnesium oxide, calcium oxide and mixtures thereof, the amount of magnesium oxide and calcium oxide present in said solid solution being effective to provide the zinc oxide with sufficient heat stability to permit processing of the plastic composition at temperatures up to about 200° C., all of the percentages and parts expressed on a weight basis, said solid solution having a specific surface area of above about 10 M$^2$/g.

19. A method of producing a flame and smoke retardant for use in halogen containing plastic compositions comprising calcining zinc oxide and another oxide selected from the group consisting of magnesium oxide, calcium oxide, and mixtures thereof at a temperature and for a time effective to produce a solid solution having flame and smoke retardant properties, said another oxide being present in an amount of about 0.1 to 10 parts by weight for each part of zinc oxide, wherein said temperature and time are sufficient to produce a solid solution having a specific surface area of above about 10 M$^2$/g.

20. The method of claim 19 wherein the temperature is above about 500° C.

21. The method of claim 19 wherein the temperature is from about 500° C. to about 1000° C.

22. A flame and smoke resistant halogen-containing plastic composition, said composition containing therein from 0.25% to 10% of a solid solution of zinc oxide and an oxide selected from group consisting of magnesium oxide, calcium oxide and mixtures thereof, the amount of magnesium oxide and calcium oxide present in said solid solution being effective to provide the zinc oxide with sufficient heat stability to permit processing of the plastic composition at temperatures up to about 200° C., said amount being from 0.1 to 10 parts magnesium oxide and calcium oxide for each part of zinc oxide, all of the percentages and parts expressed on a weight basis, said solid solution having a specific surface area of greater than about 10 M$^2$/g.

23. The composition of claim 1, 11 or 22 wherein the solid solution has a specific surface area greater than about 16 M$^2$/g.

* * * * *